United States Patent [19]

Furst

[11] 3,960,342

[45] June 1, 1976

[54] TAPE TRANSPORT APPARATUS

[75] Inventor: Marcel Furst, Sunnyvale, Calif.

[73] Assignee: American Videonetics Corporation, Sunnyvale, Calif.

[22] Filed: Oct. 24, 1974

[21] Appl. No.: 517,497

Related U.S. Application Data

[63] Continuation of Ser. No. 297,499, Oct. 13, 1972, abandoned.

[52] U.S. Cl. .............................................. 242/192
[51] Int. Cl.² ..................... G03B 1/04; G11B 15/32
[58] Field of Search ................... 242/192, 197, 199; 360/71, 137

[56] References Cited
UNITED STATES PATENTS 3,526,371   9/1970   Blackie et al. .................... 242/192

*Primary Examiner*—Leonard D. Christian
*Attorney, Agent, or Firm*—Flehr, Hohbach, Test, Albritton & Herbert

[57] ABSTRACT

A tape transport apparatus employs an annular resilient rotating drive capstan and supply and take-up rolls mounted to advance and retreat with respect to the capstan. The capstan drives at least the take-up roll while a first spring means acts upon and tends to urge both rolls with substantially equal force toward the capstan while a second spring means serves to selectively cooperate with the first named spring means to provide a greater force on one side of the capstan than on the other by employing means for releasing the force of the second spring means to act on one or the other of the two rolls.

2 Claims, 6 Drawing Figures

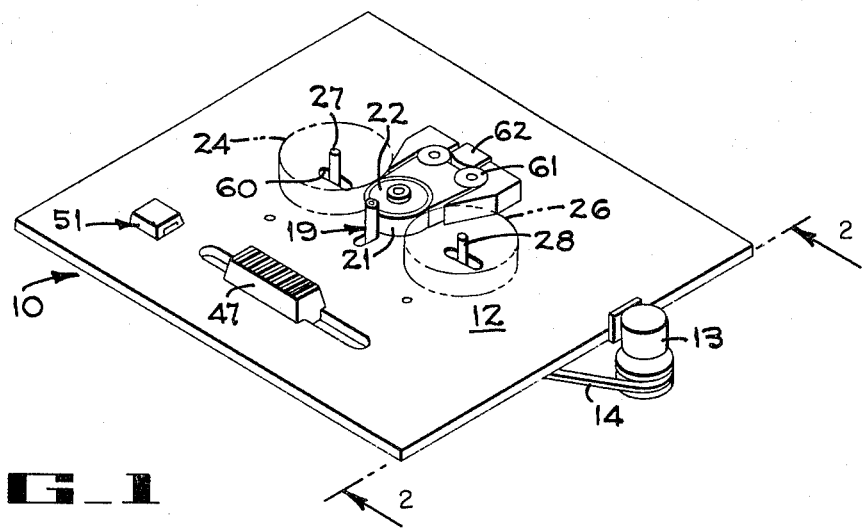
FIG_1
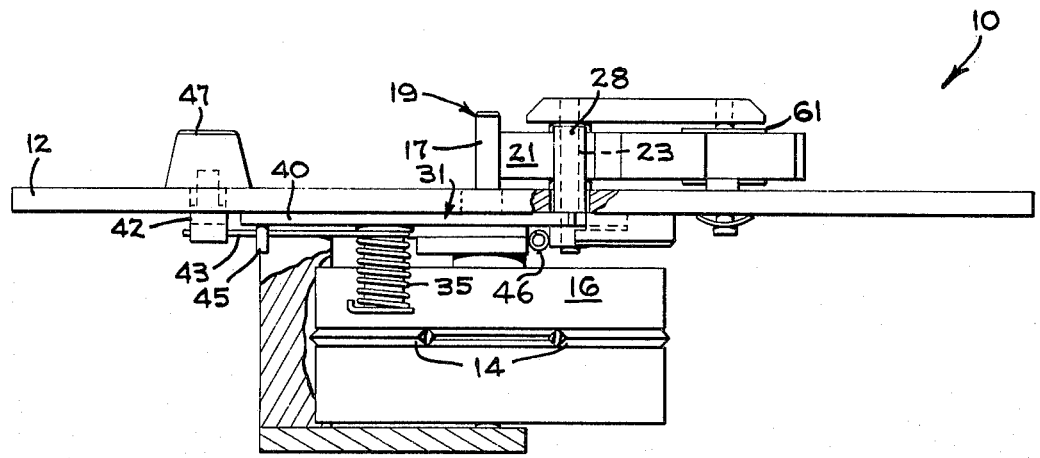
FIG_2

TAPE TRANSPORT APPARATUS

CROSS-REFERENCE TO RELATED APPLICATION

This application is a continuation of application Ser. No. 297,499, filed Oct. 13, 1972, entitled TAPE TRANSPORT APPARATUS, assigned to NEWELL INDUSTRIES INC and now abandoned.

BACKGROUND OF THE INVENTION

This invention pertains to a tape transport apparatus particularly suitable for feeding magnetic recording tape wrapped to form supply and take-up rolls and characterized by unique means for providing tension in that span of tape defined between the supply and take-up rolls. This invention is particularly useful in providing a very small, rugged tape transport, such as may be held in the palm of the hand though not limited to such particular use.

The tape transport equipment disclosed herein employs principles of operation shown in U.S. Pat. Nos. 3,370,803 and 3,370,804 wherein an annular resilient rotating body engages and drives the supply and take-up rolls while pressure is applied to the interface defined between the supply roll and the resilient drive body and a greater pressure is applied to the interface defined between the take-up roll and the drive body. In this manner, and as explained in detail in the above identified patents, the tape span extending between the supply and take-up rolls is subjected to tension so that a transducer can cooperate with the tape.

SUMMARY OF THE INVENTION AND OBJECTS

In general, there is provided herein a tape transport apparatus of a type employing a length of tape wrapped to form supply and take-up rolls and having a resilient annular rotating drive body disposed to ride against and drive at least the take-up roll. Carriage means serving to support the rolls to advance and retreat relative to the body is disclosed. A first spring means acts upon and tends to urge the rolls with substantially equal force against the drive body while a second spring means (in the form of a pair of individual springs having substantial forces available for urging the supply and take-up rolls toward the body) serves to selectively cooperate with the first named spring means to provide a greater force on one side of the drive body than on the other by employing means for releasing the force of the second spring means to act on one or the other of the rolls.

In general, it is an object of the present invention to provide an improved tape transport apparatus.

It is a further object of the present invention to provide a tape transport apparatus having a relatively simple mechanical means for tensioning tape in a manner where one roll of tape is pressed against a resilient rotating drive body with greater force than the other roll of tape.

It is a further object of the invention to provide an improved tape transport apparatus wherein spring means are selectively controlled to provide the application of a difference in forces at the interfaces on the opposite sides of a rotating, resilient annular drive body.

The foregoing and other objects of the invention will become more readily evident from the following detailed description of a preferred embodiment.

BRIEF DESCRIPTION OF THE DRAWINGS

FIG. 1 shows a diagrammatic perspective view of a tape transport apparatus according to the invention with covers removed and portions broken away for clarity;

FIG. 2 shows a side elevation view taken along the line 2—2 of FIG. 1, in partial section, showing a tape transport apparatus according to the invention;

DETAILED DESCRIPTION OF A PREFERRED EMBODIMENT

Figure 3:
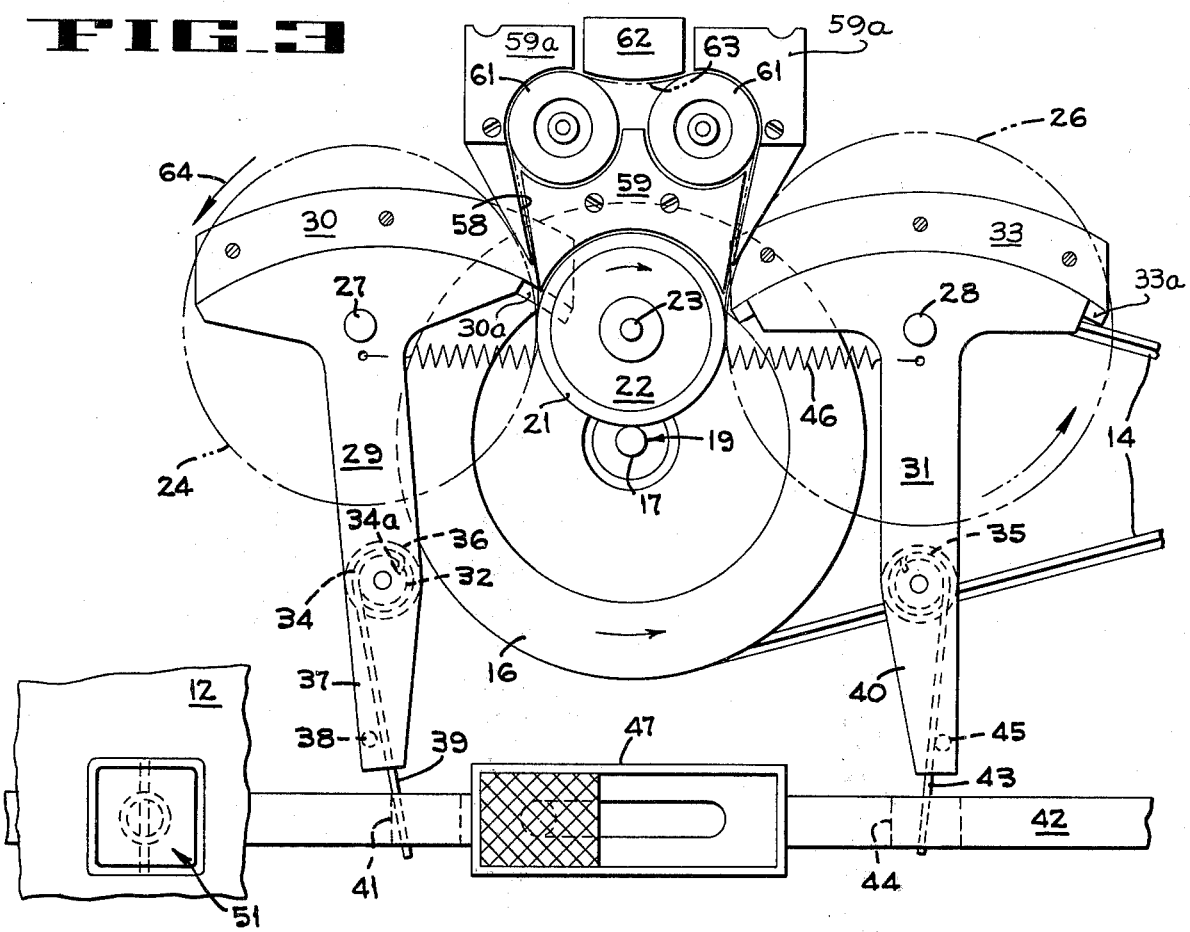
FIG. 3 shows, in diagrammatic form, a top plan view of tape transport apparatus according to the invention.

The tape transport apparatus 10 comprises, in general, a deck 12 for carrying the major components of the system.

A drive motor 13 drives, by means of the belt 14, a flywheel 16 as is mounted for rotation with shaft 17. The upper end of shaft 17 serves as a drive spindle 19 disposed in driving relation with the resilient tire 21 of an annular idler body 22 mounted for rotation on the support axle 23. Supply and take-up rolls 24, 26 of a type having hub portions are mounted upon support spindles or posts 27, 28 mounted on carriages such as swing arms 29, 31 respectively so as to support each of the rolls 24, 26 to advance or retreat relative to idler body 22.

Swing arms 29, 31 and their associated means are each constructed in substantially identical style and, accordingly, swing arm 29 will be primarily described as exemplary.

A mounting post 32 is fixed to and extends downwardly from the underside of deck 12 for receiving thereon one of the two swing arms 29, 31. Swing arms 29, 31 each include a mounting hole disposed to rotate in closely spaced relation over the exterior of pivot post 32. A coiled torsion spring 34 having a number of convolutions, on the order of six or seven, for example, is wrapped about post 32 and anchored thereto in conventional style, as for example, by bending an end 34a thereof radially inwardly into a suitable opening formed in post 32. Finally, a snap washer 36 engages a groove on post 32 to hold swing arm 29 or 31 on its post.

Each swing arm 29, 31 includes a lever portion 37, 40 carrying a pin 38, 45 disposed transversely of the plane of portion 37, 40 for engaging the tailpiece 39, 43 of coil spring 34, 35. Tailpiece 39 associated with swing arm 29 is captured in an elongate notch 41 formed beneath the elongate control bar 42 for purposes as will be explained further below. Similarly, tailpiece 43 associated with coil spring 35 pertaining to swing arm 31 is captured in an elongate notch 44 also formed beneath control bar 42. In the present description roll 24 shall be deemed the "supply" roll and roll 26 the "take-up" roll even though the tape may be fed in either direction whereupon roll 26 becomes the supply roll and roll 24 the take-up roll.

Springs 34, 35 may be considered to be "variable force" springs in the sense that, as these springs are bent, displaced, compressed, tightened or increasingly coiled, their reacting force will increase in proportion to the degree of such displacement.

A bias spring 46 extends between the ends of the two swing arms 29, 31 so as to draw the ends thereof together to bring the supply and take-up rolls 24, 26 into engagement with the tire carried on annular idler body 22.

As explained in greater detail in U.S. Pat. Nos. 3,370,803 and 3,370,804, tension may be applied to the span of tape extending between supply and take-up rolls 24, 26 by applying a greater compressive force to the interface defined between an annular resilient drive body (such as idler 22) and a take-up roll 26 of tape than is provided at the interface defined between the annular resilient rotating drive body and the supply roll 24 of tape.

Accordingly, control bar 42 in conjunction with the bias spring 46 and the coil spring tailpieces 39, 43 serves to provide a greater compressive force urging the take-up roll against body 22 than urges the supply roll against body 22 as now to be described.

Figure 4A:
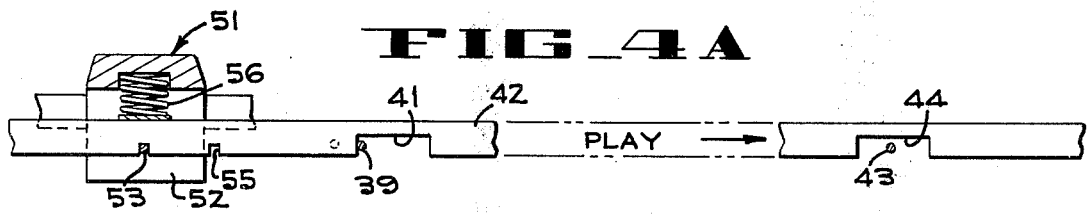
FIGS. 4A – 4C show, in diagrammatic form, the various positioning operations of control bar 42 for operating the tape transport apparatus in either of two directions and for relieving pressure upon the idler at a neutral "at rest" position.

A control button or slide 47 secured to bar 42 moves back and forth to operate bar 42 between advanced and retracted positions. Assuming that swing arm 29 and its associated support spindle 27 carries the roll of tape 24, and further assuming that it is desired to feed tape from that roll to take-up roll 26 carried on swing arm 31, slide 47 is moved to the right as shown in FIG. 4A of the drawing.

This action serves to cause the left hand edge of notch 41 to engage tailpiece 39 of coil spring 34 and to move it away from pin 38 so as to relieve spring pressure from lever portion 37 of swing arm 29, i.e., on the "supply" side of transport 10. At the same time, the above noted rightward movement of bar 42 serves to position the edge of notch 44 sufficiently clear of the end of tailpiece 43 so as to permit the spring action thereof to freely act upon pin 45 in an unfettered manner whereby greater compressive force is applied between take-up roll 26 and idler body 22 than between supply roll 24 and body 22.

Readily releasable means for engaging and holding bar 42 in the above "play" position comprises the push button 51 formed with sides 52 flanking bar 42 and carrying a transversely extending detent wire 53 disposed at a level to be moved into and out of detent notches 54, 55 under the action of coil spring 56 disposed between button 51 and bar 42.

Thus, bar 42 is shifted to the right or left until detent wire 53 engages notch 54 or 55 so as to form a keeper for bar 42.

In feeding tape in a reverse direction, the above conditions are reversed and roll 26 becomes the supply. Thus, bar 42 is simply reversed to rewind the tape from the take-up roll 26 onto the supply roll 24. In this situation, the roles of slots 41 and 44 are simply reversed whereby tailpiece 39 becomes unfettered by its associated slot 41 and tailpiece 43 is prevented from acting fully upon pin 45 by virtue of engagement with the righthand end wall of slot 44 by tailpiece 43.

Finally, an "off" position has been provided by forming the slots 44, 41 in a manner whereby disposing slide 47 midway between the above two positions serves to move both tailpieces 39, 43 to positions preventing them from acting against their respective swing arm pins 38, 45 and in this way the compression at the interface between idler body 22 and both rolls 24, 26 is reduced to relieve the tire of body 22 from sustained pressure applied at localized locations as can prove harmful by causing "flat spots" on the tire.

The tape lies in a guideway comprising tape channel 58 defined between a stationary guide block 59 secured to deck 12 and guide portion 59a.

Means for guiding and supporting a span of tape between the supply and take-up rolls further includes a pair of guide rollers 61 mounted for rotation in positions flanking a magnetic transducer assembly 62 whereby transducer assembly 62 bears against the unsupported span 63 of tape disposed between rollers 61.

Accordingly, operation of the transport assembly proceeds substantially as follows. A length of tape from a roll 24 of tape is threaded via channel 58 and rollers 61 to roll 26 for attachment. Roll 24 is disposed upon support spindle 27 carried by swing arm 29. Spindle 27 protrudes via an arcuate slot 60 in deck 12 for receiving supply roll 24.

After supply roll 24 is properly disposed upon spindle 27, swing arm 29 is permitted to be drawn under the urging of bias spring 46 to dispose the periphery of the roll of tape into engagement with tire 21 of body 22.

At that point, slide 47 is moved to the right (as shown in FIG. 4A) to condition the tailpiece 39, 43 as above noted to increase the compressive force between take-up roll 26 and tire 21 as compared to the compressive force between supply roll 24 and tire 21. Power can then be fed to the drive motor 13 for belt-driving, via belt 14, the fly wheel 16, and in this manner rotate drive spindle 19 which engages tire 21 to rotate annular idler body 22 whereby both the supply roll and take-up roll are rotated by direct engagement with tire 21 on idler body 22.

In this mode of operation, roll 24 rotates in the direction of arrow 64. During this feeding of tape in the foregoing direction as indicated by arrow 64, tension is applied to the tape span 63 defined between the rolls by means of the movement of slide 47 to the right whereby tailpiece 39 of coil spring 34 is drawn out of engagement with pin 38 carried on lever portion 37 of swing arm 29. This tends to reduce the compression applied at the interface between the supply roll and idler body 22 as compared to that on the take-up side where there is a relative increase in compression due to the fact that tailpiece 43 of coil spring 34 on the take-up side remains unfettered by being disposed midway in its notch 44. Under these circumstances, tailpiece 43 acts firmly against pin 45 so as to add to the force of spring 46 in urging swing arm 31 toward idler body 22.

Figure 4B:
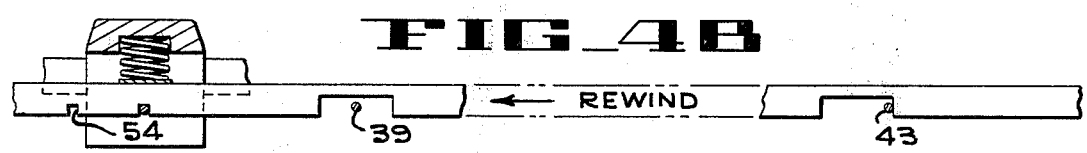
Figure 4C:
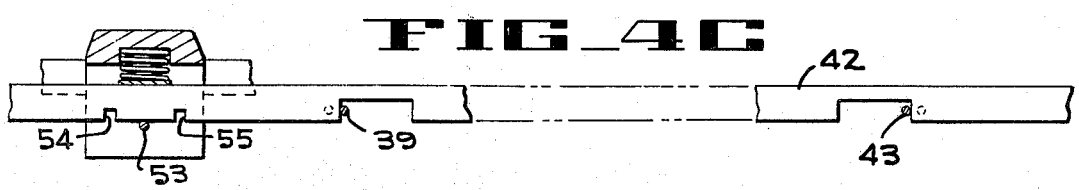

At such time as it is desired to feed tape from roll 26 back to roll 24, slide 47 (and bar 42) is simply moved in the rewind direction (to the left) (FIG. 4B) to reverse the forces acting on swing arms 29, 31 and their associated rolls and also reverses the switch controlling motor 13 so as to cause roll 24 to operate in a direction opposite to that of arrow 64.

Thus, leftward movement of slide 47 serves to move bar 42 to the left until latched by detent 53 with notch 55.

I claim:

1. In a tape transport apparatus of a type employing a length of pliable record tape wrapped to form supply and take-up rolls and a resilient, annular rotating drive body disposed to ride against and drive the take-up roll, first and second carriage means serving to respectively support said supply and take-up rolls to advance and retreat relative to said body, first spring means coupled to draw both said rolls with substantially equal force toward said body, second and third spring means respectively coupled to said first and second carriage means for urging said rolls toward said body, said second and third spring means each comprising a coil spring having one end anchored and the other forming a tailpiece extending away from said coil spring, each said carriage including means for releasably engaging an associated one of said tailpieces so as to couple the spring force thereof to move its associated carriage in a direction urging one of said rolls against said body, means selectively engaging one or the other of said tailpieces and moving same to relieve its engagement between said tailpiece and the last named means to cause one or the other of said rolls to be urged against said body with a force different from that force urging the other roll against said body, and readily releasable latch means serving to engage and latch the last named means in one or the other of its conditions of engagement.

2. In a tape transport apparatus of the type employing a length of pliable record tape wrapped to form supply and take-up rolls, a resilient annular rotating drive body disposed to ride against and drive both the take-up roll and the supply roll, first and second carriage means serving to respectively support said supply and take-up rolls to advance and retreat relative to said body, spring means coupled between and common to both said first and second carriages to draw said carriages together toward the drive body with substantially equal forces applied to each carriage, a first force differential spring of variable force disposed to engage a portion of said first carriage to directly add its own force to that force of the first named spring means acting upon said first carriage and the roll when feeding the tape in a first direction, a second force differential spring of variable force disposed to engage a portion of said second carriage to directly add its own force to that force of the first named spring means acting upon said second carriage and the roll thereof when feeding the tape in a second direction, and a movable control member selectively translatable between advanced and retracted positions to engage one or the other of said first and second force differential springs in a manner to inhibit the applied force thereof from acting upon its associated carriage and the roll thereof to cause one or the other of said rolls to be urged against said body with a force different from that force urging the other roll against said body.

* * * * *